(12) United States Patent
Dross et al.

(10) Patent No.: US 8,931,927 B2
(45) Date of Patent: Jan. 13, 2015

(54) FACETED FOLDED-OPTIC COLLIMATOR

(75) Inventors: Oliver Dross, Cologne (DE); Ruben Mohendano, Madrid (ES); Julio C. Chaves, Coimbra (PT); Fernando Munoz, Madrid (ES); Juan Carlos Minano, Madrid (ES); Waqidi Falicoff, Stevenson Ranch, CA (US)

(73) Assignee: Light Engine Limited, Shatin (HK)

( * ) Notice: Subject to any disclaimer, the term of this patent is extended or adjusted under 35 U.S.C. 154(b) by 255 days.

(21) Appl. No.: 13/492,455

(22) Filed: Jun. 8, 2012

(65) Prior Publication Data

US 2013/0044494 A1  Feb. 21, 2013

Related U.S. Application Data

(60) Provisional application No. 61/495,094, filed on Jun. 9, 2011, provisional application No. 61/499,250, filed on Jun. 21, 2011.

(51) Int. Cl.
*F21V 7/00* (2006.01)
*G02B 19/00* (2006.01)

(52) U.S. Cl.
CPC ........ *G02B 19/0028* (2013.01); *G02B 19/0061* (2013.01)
USPC ........................ 362/297; 362/296.01; 362/327

(58) Field of Classification Search
CPC .......... F21V 13/04; F21V 7/0025; F21V 7/00
USPC ...................................... 362/296.01, 297, 327
See application file for complete search history.

(56) References Cited

U.S. PATENT DOCUMENTS

| | | |
|---|---|---|
| 4,592,627 A | 6/1986 | Smid |
| 4,631,397 A | 12/1986 | Ohsato et al. |
| 6,639,733 B2 | 10/2003 | Minano et al. |
| 6,896,381 B2 | 5/2005 | Benitez et al. |
| 7,152,985 B2 | 12/2006 | Benitez et al. |
| 7,181,378 B2 | 2/2007 | Benitez et al. |
| 7,616,389 B2 | 11/2009 | Togino |
| 2009/0052190 A1 | 2/2009 | Shimada |
| 2010/0046218 A1 | 2/2010 | Huang |
| 2010/0195335 A1 | 8/2010 | Allen et al. |
| 2011/0061721 A1 | 3/2011 | Chen et al. |

*Primary Examiner* — Anh Mai
*Assistant Examiner* — Meghan Dunwiddie
(74) *Attorney, Agent, or Firm* — Schiff Hardin LLP

(57) ABSTRACT

A folded circularly symmetric illumination optic comprising a first light transfer mode having a first central refractive surface and a second central refractive surface, wherein one of the first and second central refractive surfaces has at least one peened feature; a second light transfer mode having a first refractive surface, a first TIR surface, a second TIR surface and a second refractive surface; a third light transfer mode having a first refractive surface, a first TIR surface and a second refractive surface, wherein the first TIR surface has at least one peening feature, and wherein the second refractive surface is conical; wherein the first TIR surface and second refractive surface of the second light transfer mode is coincident at least one point, wherein the second refractive surface of the third light transfer mode is coincident with the first TIR surface and second refractive surface of the second light transfer mode.

12 Claims, 11 Drawing Sheets

FACETED FOLDED-OPTIC COLLIMATOR

CROSS REFERENCE TO RELATED APPLICATION

This application claims benefit under 35 U.S.C. §119(e) to U.S. Ser. Nos. 61/495,094, filed Jun. 9, 2011, and 61/499,250, filed Jun. 21, 2011, which are both hereby incorporated by reference in this application.

Throughout this application, several references and patents are referenced herein. Disclosure of these references and patents in their entirety is hereby incorporated by reference in this application.

BACKGROUND OF THE INVENTION

High efficiency etendue limited folded optics have been known for some years, such as U.S. Pat. Nos. 6,639,733, 6,896,381, 7,152,985, 7,181,378, all of which have several inventors in common with the present application. However, such prior art optics work best for narrow exit angles, which may not be desirable in some applications. Also, when used with light sources that have color separation or non uniform luminance (as nearly all LED light sources), these optics may create a pattern that mimics the color separation of the source or create artifacts that reflect the form or placement of the chip or chips. This may be a serious disadvantage in some applications in which a uniform color pattern or intensity distribution is necessary.

SUMMARY OF THE INVENTION

The present invention solves the practical issues presented by traditional high efficiency folded optics, by providing an optical architecture and method of design where the resulting optic (in combination with a solid state light source) has a wide angular output pattern and mixes the light output in such a way that the structure of the source no longer influences the uniformity of the output pattern.

The present invention addresses the aforementioned problem by adding specially designed peening features to optical surfaces of one embodiment in U.S. Pat. No. 6,896,381 ("patent '381"). The new optic increases the output angle and mixes said output light compared to the original one so that the structure (mechanical or color) of the source is no longer visible in the output pattern. The peening process consists of adding at least one peening feature (e.g., a small "bump" or a plurality of "bumps" (as discussed below, such "bump" can have the same or differing characteristics relative to another "bump") to the two of the surfaces of embodiment shown in FIG. 17 of patent '381. Also some changes are made to the geometry of the surfaces of FIG. 17 of patent '381 to improve light mixing. In embodiments of the present invention, surface 323 in FIG. 17 of patent '381 can be replaced by a conical surface. In one embodiment in the present invention convex surface 322 of patent '381 is replaced with a planar surface and interior surface 329 is replaced with a peened planar surface (feature 701 of FIG. 7). In a preferred embodiment in the present invention surface 322 of patent '381 is left convex and interior surface 329 is replaced with a peened planar surface.

In accordance with a first aspect of the present invention, a folded circularly symmetric illumination optic comprising: a first light transfer mode having a first central refractive surface and a second central refractive surface, wherein one of the first and second central refractive surfaces has at least one peened feature; a second light transfer mode having a first refractive surface, a first Total Internal Reflection ("TIR") surface, a second TIR surface and a second refractive surface; a third light transfer mode having a first refractive surface, a first TIR surface and a second refractive surface, wherein the first TIR surface has at least one peening feature, and wherein the second refractive surface is conical; wherein the first TIR surface and second refractive surface of the second light transfer mode is coincident at least one point, wherein the second refractive surface of the third light transfer mode is coincident with the first TIR surface and second refractive surface of the second light transfer mode.

In accordance with a second aspect of the present invention, a folded circularly symmetric illumination optic comprising: a first light transfer mode comprising a first central refractive surface and a second central refractive surface, wherein one of the first and second central refractive surfaces has at least one peened feature; a second light transfer mode having a third refractive surface, a first TIR surface, a second TIR surface and a fourth refractive surface, wherein the first TIR surface and fourth refractive surface are coincident at least one point; and a third light transfer mode which has a fifth refractive surface, the second TIR surface, and a sixth refractive surface, wherein the second TIR surface has at least one peening feature; and wherein the sixth refractive surface is coincident with the first TIR surface and fourth refractive surface at least one point.

In another aspect, the sixth refractive surface is conical.

In another aspect, the second TIR surface is conical.

In another aspect, the first central refractive surface of the first light transfer mode is planar, and the second central refractive surface of the first light transfer mode is curved.

In another aspect, the first refractive surface is planar, and the second refractive surface is curved.

In another aspect, the at least one peened feature is a bump or a plurality of bumps.

In another aspect, the bump allows a spread beam angle range from 15 degrees to 60 degrees.

In another aspect, the plurality of bumps comprises at least one bump which allows a spread beam angle range from 15 degrees to 60 degrees.

In another aspect, the bump has a lens size with a diameter range from 20 mm to 50 mm.

In another aspect, the plurality of bumps comprises at least one bump which has a lens size with a diameter range from 20 mm to 50 mm.

In accordance with a third aspect of the present invention, a lighting apparatus comprising the folded circularly symmetric illumination optic herein.

BRIEF DESCRIPTION OF THE DRAWINGS

The figures are for illustration purposes only and are not necessarily drawn to scale. The present invention itself, however, may be best be understood by reference to the detailed description which follows when taken in conjunction with the accompanying drawings in which.

DETAILED DESCRIPTION OF THE INVENTION

A better understanding of various features and advantages of the present invention will be obtained by reference to the following detailed description of embodiments of the present invention and accompanying drawings, which set forth illustrative embodiments in which the principles of the invention are utilized.

We will first start with the background information needed to design the peened features.

Figure 1:
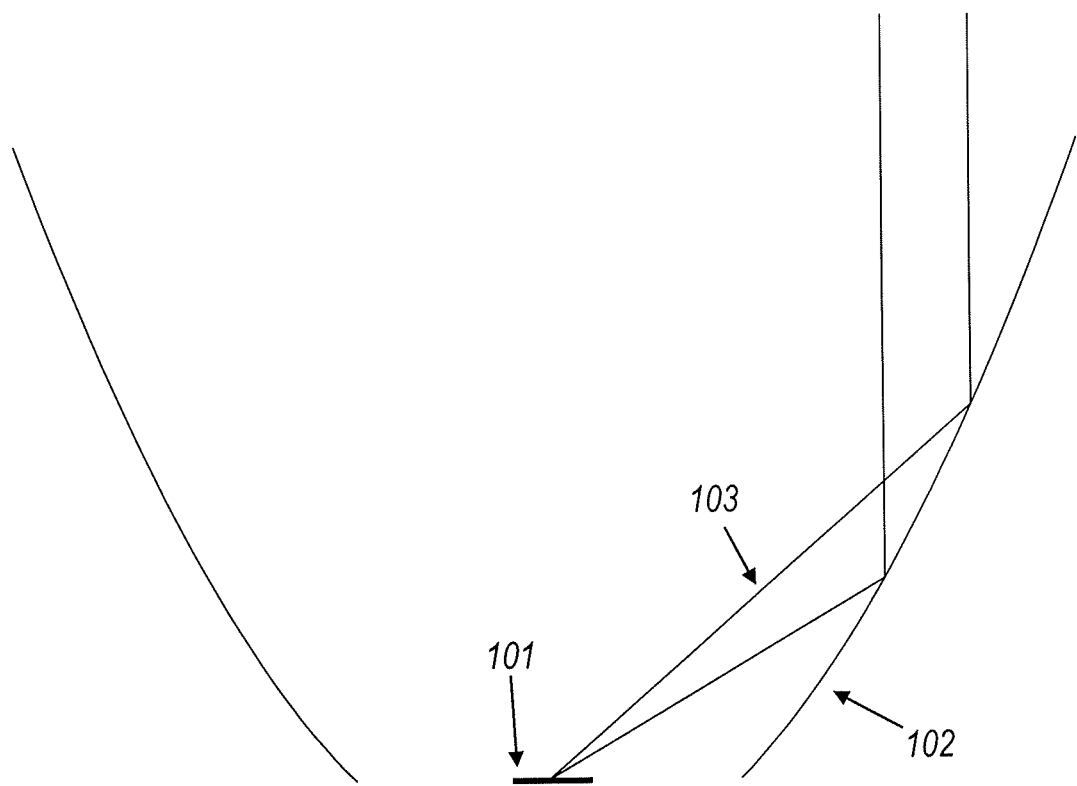
FIG. 1 shows a standard open parabolic reflector with a light source in accordance with an embodiment of the present invention.

FIG. 1 shows a light source 101 whose light is collimated by a reflective surface 102. Rays 103 coming from the source are reflected and emitted vertically.

Figure 2A:
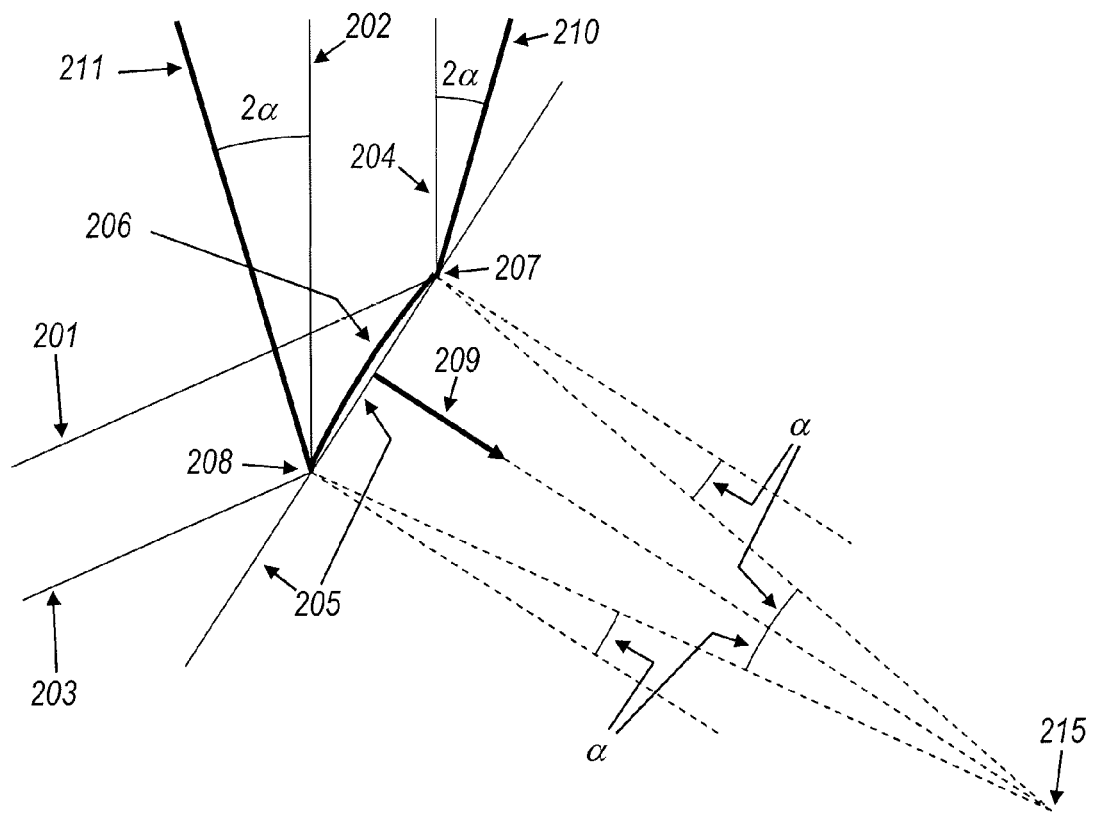
FIG. 2A shows a 2D segment on the same reflector shown in FIG. 1 with an exemplary convex peening feature in profile.

FIG. 2A shows a detail of a collimating optic similar to that in FIG. 1. Light rays 201 and 203 coming from the light source are reflected upwards as rays 202 and 204 by reflective surface 205. Reflective surface 205 is part of that generic collimator optic similar, for example, to that in FIG. 1. Rays 202 and 204 are essentially parallel and the light output is highly collimated.

Spreading of the output pattern can be achieved by replacing the smooth surface 205 by small "bumps" that spread the outgoing light. In this example, one of these "bumps" is an arc of a circle 206 (thick line) centered at 215 with end points 207 and 208. At each one of these points the normal to the circle makes an angle α to the normal 209 to reflective surface 205. Ray 201 will now be reflected by curved reflective surface 206 at point 207 in direction 210 making an angle 2α to ray 204. Also, ray 203 is now reflected at point 208 in direction 211 making an angle 2α to ray 202. Incoming rays parallel to 201 and 203 are reflected by 206 in directions contained between those of 210 and 211. The output pattern is then spread by a total angle 4α. Similar "bumps" can be added to surface 205 resulting in an irregular surface. "Bumps" can also have a shape/size which allows a spread beam angle range from 15 degrees to 60 degrees and/or a lens size with a diameter range from 20 mm to 50 mm.

In general rays 201 and 203 are not parallel, but in any case the incident and reflected directions at point 207 define the normal to the "bump" at that point. Also, the incident and reflected directions at point 208 define the normal to the "bump" at that point. A curve can then be adjusted between points 207 and 208 that matches the desired normals. Other options include having a "bump" that starts at point 207 but does not exactly end at point 208. The circular curves can also be replaced by conics or tailored contours.

Figure 2B:
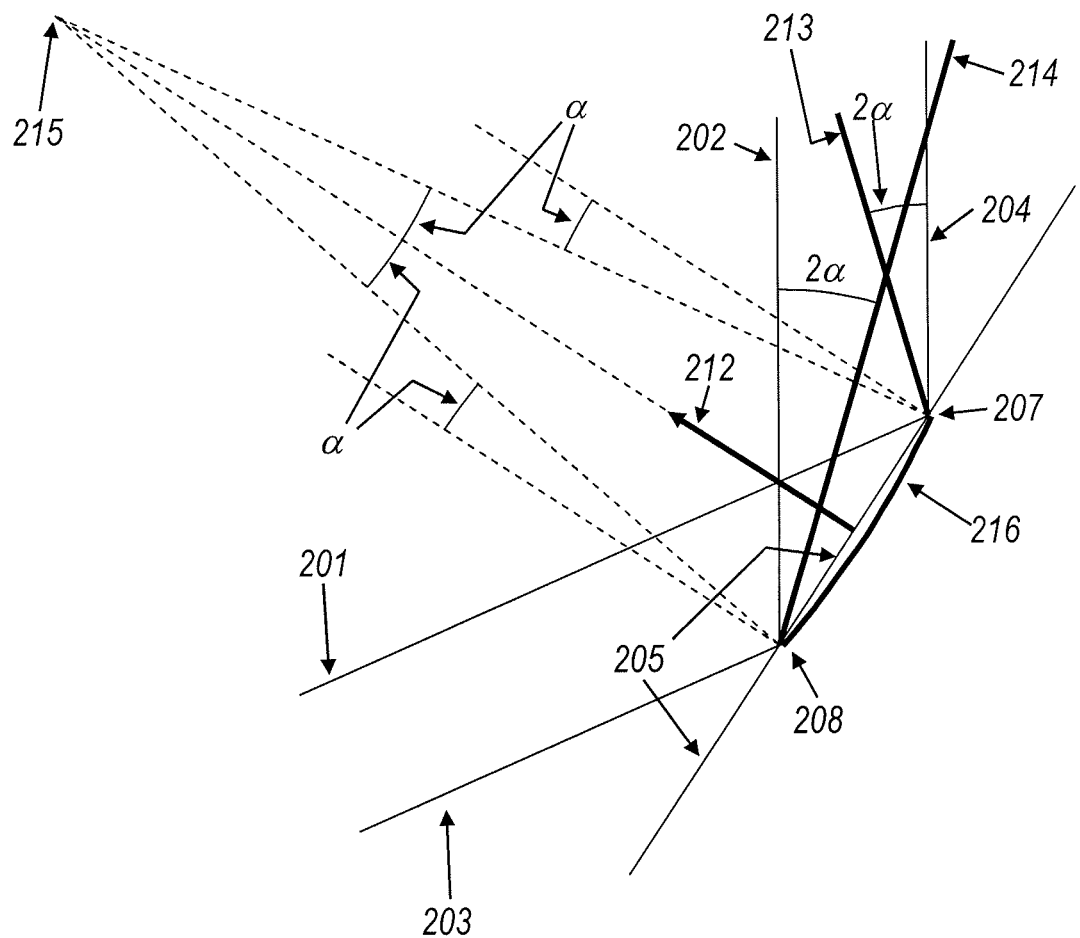
FIG. 2B shows a 2D segment on the same reflector shown in FIG. 1 with an exemplary concave peening feature in profile.

FIG. 2B shows a similar situation to that in FIG. 2A, only now lenticulation 216 is concave instead of convex, as 206 in FIG. 2A. Again, spreading of the output pattern can be achieved by replacing the smooth surface 205 by small "bumps" that spread the outgoing light. In this example, one of these "bumps" is a circle 216 with end points 207 and 208. At each one of these points the normal to the circle makes an angle α to the normal 212 to reflective surface 205. Ray 201 will now be reflected by curved reflective surface 216 at point 207 in direction 213 making an angle 2α to ray 204. Also, ray 203 is now reflected at point 208 in direction 214 making an angle 2α to ray 202. Incoming rays parallel to 201 and 203 are reflected by 216 in directions contained between those of 213 and 214. The output pattern is then spread by a total angle 4α. Similar "bumps" can be added to surface 205 resulting in an irregular surface.

Figure 3A:
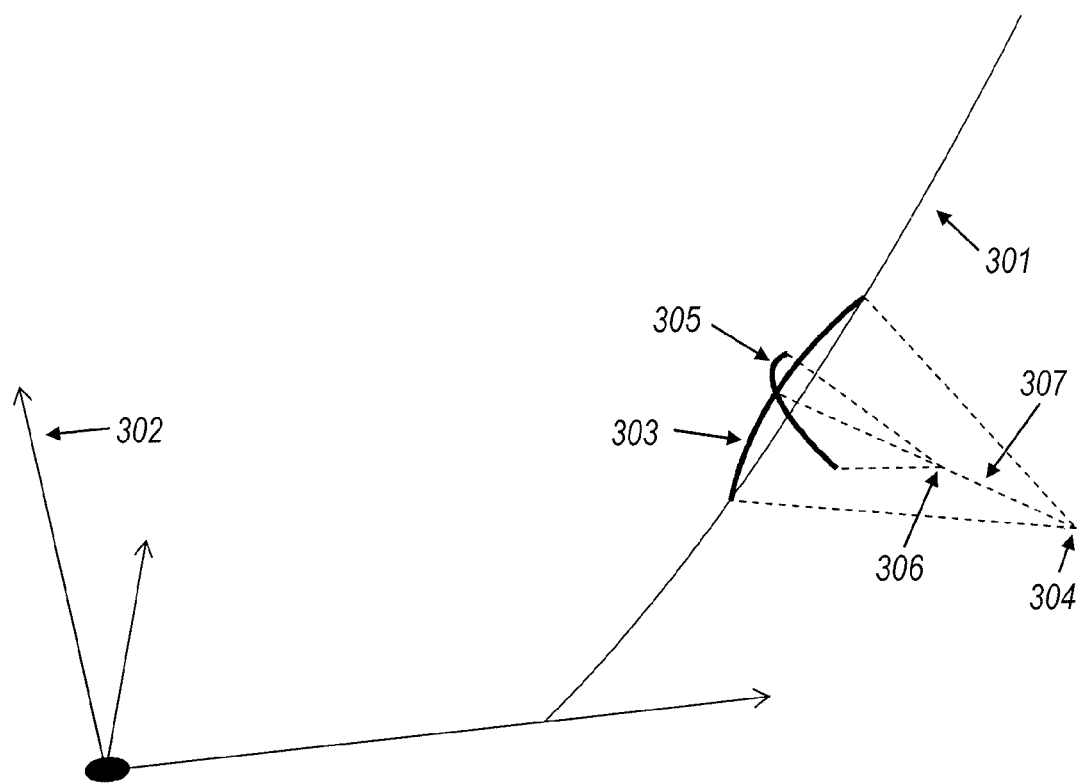
FIG. 3A shows a 3D illustration of 2 profiles on same reflector segment illustrating a convex peening feature in accordance with an another embodiment of the present invention.

FIG. 3A shows a 3D view of a reflective profile 301 of a collimating optic with circular symmetry around axis 302. The meridian plane shape of the "bump" on the reflective surface is defined by circular space curve profile 303 with center 304 (although other shape profiles are also possible as described above) and space curve profile 305.

Profile 303 can be convex or concave (as in FIG. 2A and FIG. 2B). The same is true for profile 305. This results in four possible shapes for the lenticulation based on profiles 303 and 305.

The shape of the "bump" in the direction perpendicular to the vertical plane (containing axis 302 and curve 301) is defined by another circular profile 305 with center 306 located on line 307 perpendicular to profile 301. Arc 305 is defined by its radius and its angular aperture, as seen from its center 306. These two parameters can be adjusted by imposing two conditions.

Figure 3B:
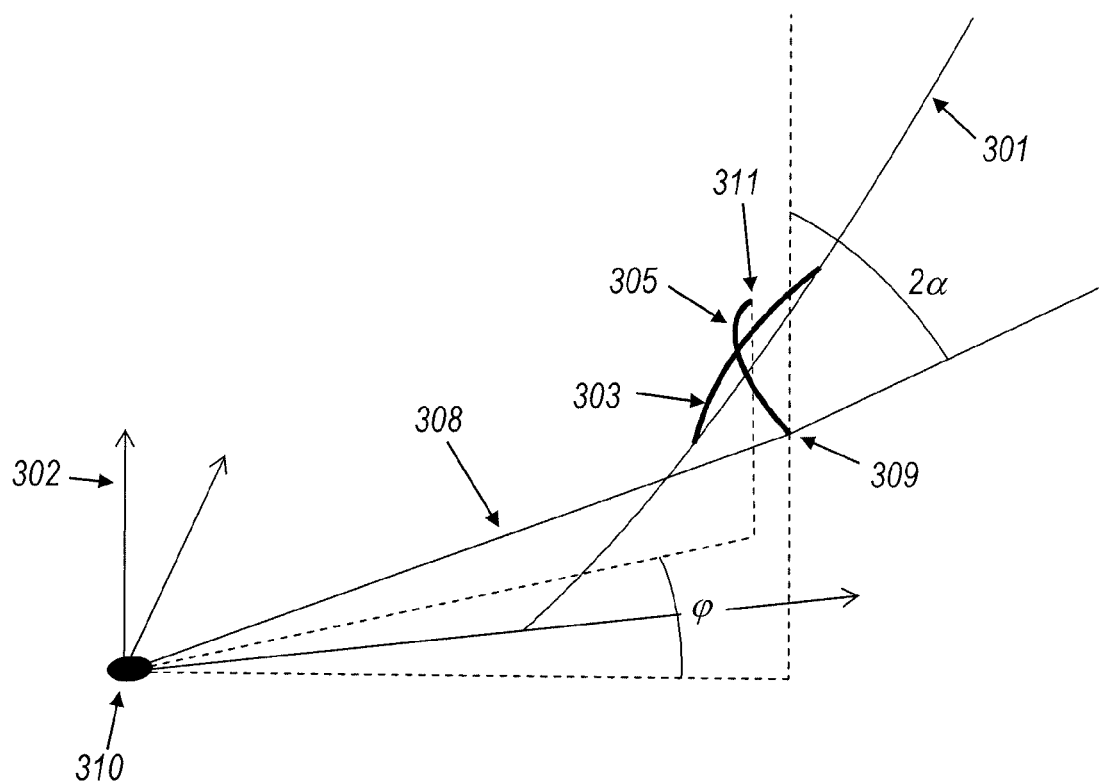
FIG. 3B shows another view of FIG. 3A with ray and other additional information.

FIG. 3B shows again the same "bump" profiles 303 and 305 as in FIG. 3A. A light ray 308 coming from source 310 hits the edge 309 of profile 305 and leaves in a direction that makes an angle 2α to the vertical (parallel to axis 302).

Also, when projected onto the horizontal plane, edge point 309 and its symmetrical edge point 311 subtend an angle φ to the source 310. Angle φ is given by φ=2π/N where N is the number of lenticulations in the circular direction (around axis 302). The above conditions define the two parameters of arc 305: its radius and its angular aperture, as seen from its center 306.

The radius of curvature for a peened surface can be calculated once the desired angular spread and the dimension of the peen feature is determined in the two directions. A useful equation is provided in the book "The Optical Design of Reflectors", by W. Elmer, $2^{nd}$ Edition, by equation 2 (pg. 27) for calculating the radius of curvature of a convex peen as follows:

$$r_p = \frac{r_f}{\left[\left(2\frac{r_f}{w}\right)^2 - 1\right]^{\frac{1}{2}} \sin\left(\frac{\theta}{2}\right) + \cos\left(\frac{\theta}{2}\right)}$$

Where, $r_p$ is the radius of curvature of the peen surface, $r_f$ is the radius of curvature of reflector surface at point of peening, w is the dimension of the peened feature, θ is the maximum desired angular spread (equal to 2α). For the case when the peen is concave (or a dent in the nomenclature of Elmer) the equation becomes:

$$r_p = \frac{r_f}{\left[\left(2\frac{r_f}{w}\right)^2 - 1\right]^{\frac{1}{2}} \sin\left(\frac{\theta}{2}\right) - \cos\left(\frac{\theta}{2}\right)}$$

The two profiles obtained by the method described above can now be used to build a surface containing them, which will be used as a lenticulation. The technique for creating a surface from the two curves is to use the so-called sweep transformation used in computer aided design software such as Rhinoceros by McNeel North America of Seattle, Washington. One of the curves is chosen to be the rail curve for the sweep (the direction for the sweep, while the second curve is the so-called section curve for the sweep (the profile that is swept along the rail curve). The process is well known to those skilled in the art of computer aided design. Either resultant surface can be used.

Figure 3C:
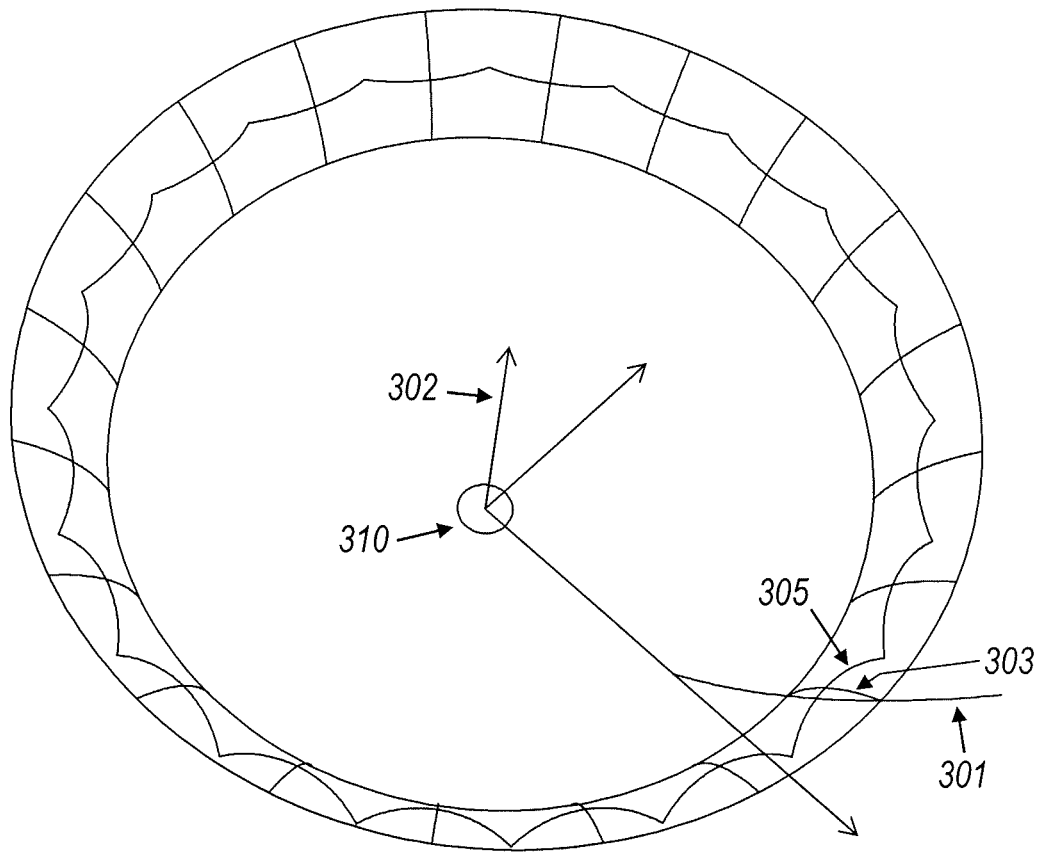
FIG. 3C shows a 3D view of a reflector with at least one peened feature in accordance with an embodiment of the present invention.

FIG. 3C shows several lenticulations placed around symmetry axis 302, forming a complete circle.

Figure 4:
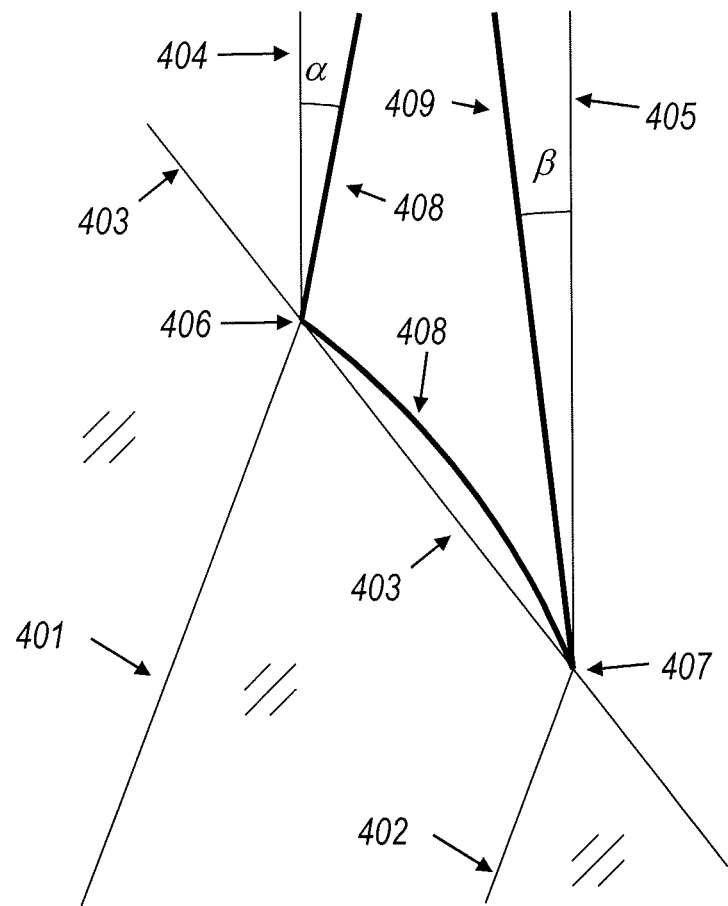
FIG. 4 shows a close-up of exemplary peening on a refractive surface in accordance with an embodiment of the present invention.

FIG. 4 shows a refractive surface 403 and incident rays 401 and 402 which are refracted in directions 404 and 405, respectively. Now a portion of the optical surface between points 406 and 407 can be replaced by a "bump" 408. Rays 401 and 402 are now refracted at points 406 and 407 in directions 408 and 409 respectively, making angles α and β to 404 and 405 respectively. As in the case of the refractive optical surface, also here the shape of 408 can be adjusted, for example, so that α=β with β having a prescribed value, or 408 can be forced to be, for example, an arc of a circle in which case only one of the angles can be made to coincide with a prescribed value.

As in the case of the reflective surfaces, also here the "bumps" can be convex or concave.

Figure 5:
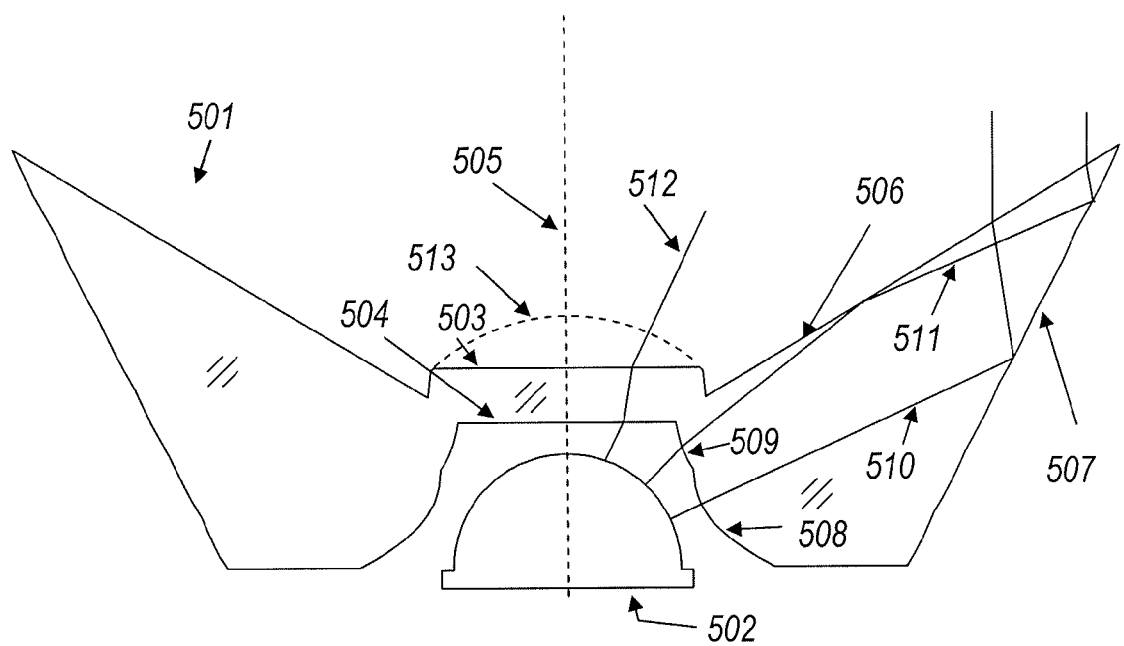
FIG. 5 shows a cross-sectional view of a preferred collimator embodiment prior to it being peened.

FIG. 5 shows the profile of a rotational folded optic 501 designed for an LED light source 502 based on the optical architecture in aforementioned FIG. 17 of patent '381. Folded optic 501, comprising planar front central refractive surface 503 or optional curved surface 513 and rear central planar refractive surface 504, side curved refractive surfaces 508 and 509, conical front surface 506 (which operates by both TIR and refraction depending on the angle of incidence of a ray) and rear TIR surface 507, is an optical architecture that can be used, into which the lenticular features described above can be built in. The ray propagation through the optic operates similar to the embodiment of FIG. 17.

There are three modes of travel. Mode one is illustrated by ray 512 which travels through the central refractive lens region defined by refractive surfaces 503 and 504. Central refractive surface can also be optionally curved as illustrated by surface 513. It can be designed as a tailored nonimaging surface to collimate the light from the extended source, as is known to those skilled in the field of nonimaging optics. The second mode of travel is illustrated by ray 511, which travels through refractive surface 509, is redirected by TIR from front conical surface 506 to rear TIR surface 507, whereupon it is redirected to front conical surface 506, where it exits the optic. The third mode of travel is illustrated by ray 510, which travels through refractive surface 508, whereupon it is redirected to rear TIR surface 507, which in turn redirects it to front conical surface 506 which refracts the ray and allows it to exit the optic. The 2D profile of back TIR surface 507 can be linear or a Cartesian oval. The 2D profile of refractive lenses 508 and 509 are Cartesian ovals. The 2D profiles are swept around central axis 504 to create the three dimensional lens. The design method for the starting optic can be described as follows.

Refractive surface 508 is a circumferentially swept hyperbola that in section collimates a point source at the center of the LED into a set of ray bundles parallel to ray 510. Refractive surface 509 is also a circumferentially swept hyperbola which behaves similarly creating a set of parallel exit rays (in 2D). The slope of front TIR surface 506 is designed so that after these rays reflect on surface 506 these rays in 2D are parallel to ray 510 just after exiting refractive surface 508. At this point all rays in any 2D section are parallel to each other, either coming from 508 (as ray 510) or from surface 506 (as ray 511 prior to striking surface 507). The constraint system further requires that all rays from surface 509 do not strike first 507 before 506. Secondly, there is the requirement that rays from 508 avoid hitting surface 506 before hitting 507. In one embodiment a further constraint can be that surface 507 be conical. The final constraint that is needed is that rays traveling in the mode 2 region must first undergo TIR on 506 and also 507, while those rays to be refracted at 506 must strike the surface at angles inside the critical angle. The above set of constraints is sufficient to one skilled in the art of nonimaging optics to complete the design. The next step is to decide on the spread angle or angles needed in the peening features.

The peen faceting of this optic can be done using the method described above. However, the incoming rays can cross other optical surfaces on their way from the source to the lenticulation and also some other optical surfaces on their way from the lenticulation towards the output pattern. In that case, the methods described above are applied to those ray paths.

Figure 6:
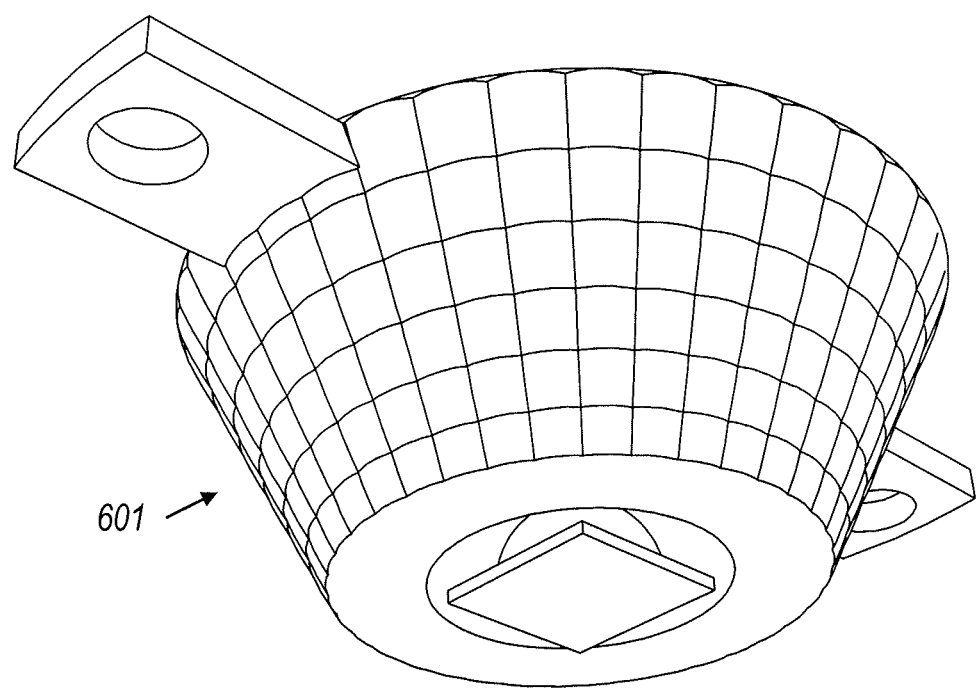
FIG. 6 is a perspective 3D view of the same collimator embodiment shown in FIG. 5 with its peened back reflector.

FIG. 6 shows the same optic as in FIG. 5, but now with faceting on its side reflective wall 601.

Figure 7:
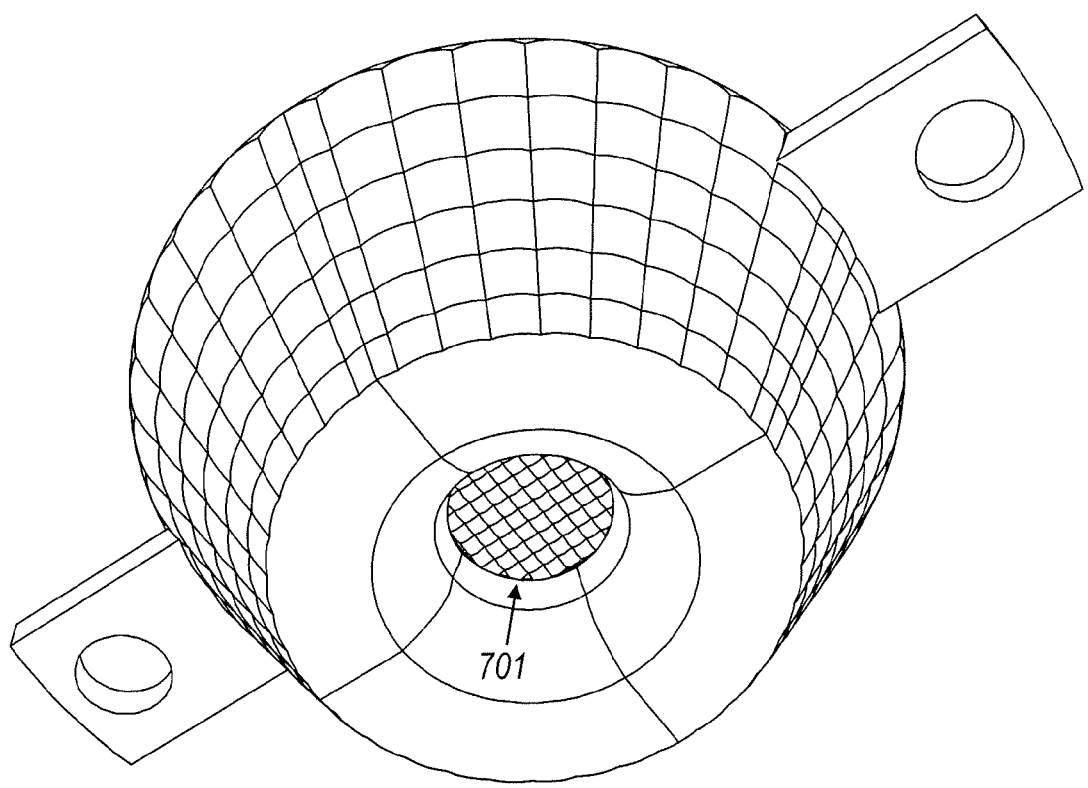
FIG. 7 is a bottom 3D perspective view of the same collimator embodiment in FIG. 6 showing both peened surfaces.

FIG. 7 shows the same optic as in FIG. 6, but now from a different perspective showing the faceting on its bottom central refractive wall 701.

Figure 8:
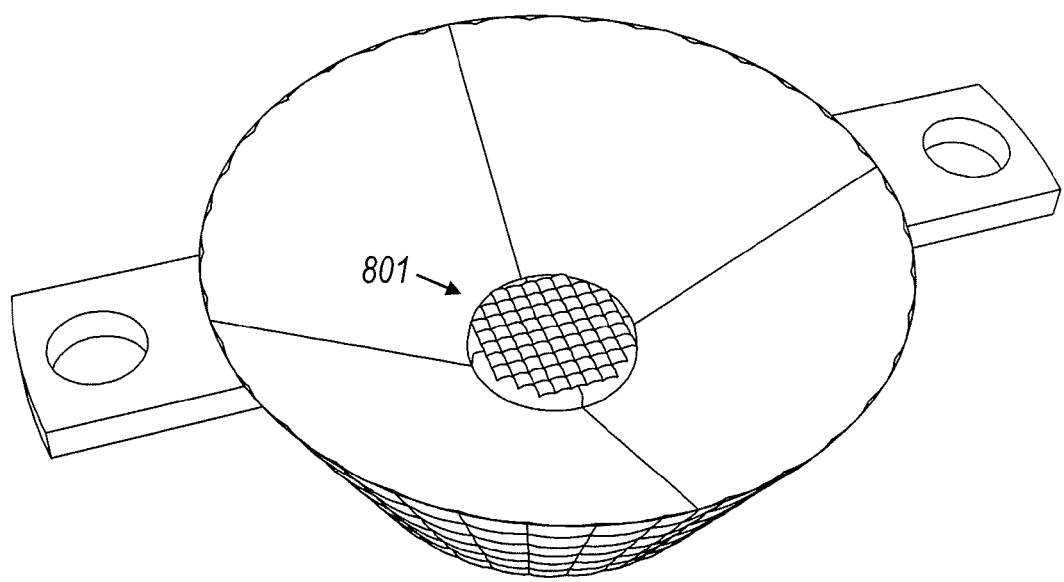
FIG. 8 shows a top 3D perspective view of a collimator embodiment with peened features on the front central face of the optic in accordance with an embodiment of the present invention.

FIG. 8 shows an alternative to the faceting of the refractive surfaces in which the top central refractive wall 801 is facetted.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A folded circularly symmetric illumination optic comprising:
    a first light transfer mode having a first central refractive surface and a second central refractive surface, wherein one of the first and second central refractive surfaces has at least one peened feature;
    a second light transfer mode having a first refractive surface, a first Total Internal Reflection ("TIR") surface, a second TIR surface and a second refractive surface;
    a third light transfer mode having a first refractive surface, a first TIR surface and a second refractive surface, wherein the first TIR surface has at least one peening feature, and wherein the second refractive surface is conical;
    wherein the first TIR surface and second refractive surface of the second light transfer mode is coincident at least one point, wherein the second refractive surface of the third light transfer mode is coincident with the first TIR surface and second refractive surface of the second light transfer mode.

2. A folded circularly symmetric illumination optic comprising:
   a first light transfer mode comprising a first central refractive surface and a second central refractive surface, wherein one of the first and second central refractive surfaces has at least one peened feature;
   a second light transfer mode having a first refractive surface, a first Total Internal Reflection ("TIR") surface, a second TIR surface and a second refractive surface, wherein the first TIR surface and second refractive surface are coincident at least one point; and
   a third light transfer mode which has a third refractive surface, the second TIR surface, and a fourth refractive surface, wherein the second TIR surface has at least one peening feature; and
   wherein the fourths refractive surface is coincident with the first TIR surface and second refractive surface at least one point.

3. The folded circularly symmetric illumination optic of claim 2, wherein the fourth refractive surface is conical.

4. The folded circularly symmetric illumination optic of claim 2, wherein the second TIR surface of the second light transfer mode and the third light transfer mode is conical.

5. The folded circularly symmetric illumination optic of claim 1, wherein the first central refractive surface of the first light transfer mode is planar, and the second central refractive surface of the first light transfer mode is curved.

6. The folded circularly symmetric illumination optic of claim 2, wherein the first central refractive surface is planar, and the second central refractive surface is curved.

7. The folded circularly symmetric illumination optic of claim 1 or 2, wherein the at least one peened feature is a bump or a plurality of bumps.

8. The folded circularly symmetric illumination optic of claim 7, wherein the bump allows a spread beam angle range from 15 degrees to 60 degrees.

9. The folded circularly symmetric illumination optic of claim 7, wherein the plurality of bumps comprises at least one bump which allows a spread beam angle range from 15 degrees to 60 degrees.

10. The folded circularly symmetric illumination optic of claim 7, wherein the bump has a lens size with a diameter range from 20 mm to 50 mm.

11. The folded circularly symmetric illumination optic of claim 7, wherein the plurality of bumps comprises at least one bump which has a lens size with a diameter range from 20 mm to 50 mm.

12. A lighting apparatus comprising the folded circularly symmetric illumination optic of claim 1 or 2.

* * * * *